United States Patent [19]

Reparaz et al.

[11] Patent Number: 5,452,334
[45] Date of Patent: Sep. 19, 1995

[54] PRESSURIZED WATER REACTOR NUCLEAR FUEL ASSEMBLY WITH DISENGAGING UPPER TIE PLATE CORNER POST

[75] Inventors: Adolfo Reparaz; Daniel L. Adams, both of Richland; William D. Bishop, W. Richland, all of Wash.

[73] Assignee: Siemens Power Corporation, Richland, Wash.

[21] Appl. No.: 169,882

[22] Filed: Dec. 17, 1993

[51] Int. Cl.6 .............................................. G21C 3/32
[52] U.S. Cl. ..................................... 376/446; 376/364
[58] Field of Search ................ 376/362, 364, 434, 446

[56] References Cited

U.S. PATENT DOCUMENTS

| | | |
|---|---|---|
| 3,769,158 | 10/1973 | Winders .............................. 376/446 |
| 3,802,996 | 4/1974 | Jones ................................... 376/446 |
| 4,208,248 | 6/1980 | Jabsen ................................. 376/446 |
| 4,476,088 | 10/1984 | Barnes ................................. 376/264 |
| 4,560,532 | 12/1985 | Barry et al. ......................... 376/434 |
| 4,688,416 | 8/1987 | Shallenberger et al. ........... 376/261 |
| 4,702,882 | 10/1987 | Stucker ............................... 376/446 |
| 4,762,676 | 8/1988 | Gjertsen et al. .................... 376/443 |
| 4,820,479 | 4/1989 | Hornak et al. ..................... 376/446 |
| 5,207,980 | 5/1993 | Gilmore et al. .................... 376/446 |

*Primary Examiner*—Daniel D. Wasil
*Attorney, Agent, or Firm*—Ira Lee Zebrak

[57] ABSTRACT

A new configuration of a pressurized water reactor nuclear fuel assembly having a disengaging upper tie plate corner portion (60) which will disengage if the fuel assembly is unintentionally lifted, thus precluding the lifting of the fuel assembly from the reactor core and thereby avoiding the potential risk of dropping the irradiated nuclear fuel assembly.

15 Claims, 5 Drawing Sheets

PRESSURIZED WATER REACTOR NUCLEAR FUEL ASSEMBLY WITH DISENGAGING UPPER TIE PLATE CORNER POST

BACKGROUND OF THE INVENTION

1. Field of the Invention

The present invention generally relates to nuclear fuel assemblies for use in nuclear reactors, and more particularly to an upper tie plate/reaction pin disengaging feature for a pressurized water reactor nuclear fuel assembly to prevent the unintentional removal of a fuel assembly from the reactor core.

2. Background

Nuclear reactors need to be periodically maintained and inspected as well as refueled. Refueling operations involve the removal of the equipment and apparatus positioned in the reactor vessel above the reactor core which comprises nuclear fuel assemblies each of which contain nuclear fuel rods. Some of the equipment which needs to be removed during refueling operations include the upper core internals and support structure, the lowermost portion of which includes the upper core support plate. During the refueling operations, the upper core support structure including the upper core plate is removed, the refueling and related fuel operations are performed, and the upper core plate is then reinstalled.

The upper core support plate serves to align the upper portion of the fuel assemblies which are positioned at their lower ends in predetermined positions in the lower core support plate so that the fuel assemblies are parallel to one another. Extending downward from the underside of the upper core plate are fuel assembly alignment pins two of which insert into two alignment holes in the upper tie plate of each of the fuel assemblies. As the upper core support plate is aligned over the top of the reactor core and lowered onto the fuel assemblies, the alignment pins slide into their respective alignment holes and align the upper portion of the fuel assemblies into their predetermined positions. FIG. 2 depicts two of the alignment pins of this upper core support plate properly disposed through the alignment holes in the upper tie plate of a fuel assembly.

If misalignment occurs between one or both of the alignment pins which are to be inserted into each fuel assembly, and the fuel assembly, then the bent alignment pin(s) can fail to be inserted into its respective alignment hole in the upper tie plate and become wedged against the upper tie plate, or can be inserted into and become wedged into its respective alignment hole in the upper tie plate. (FIG. 3).

Such misalignment, bending and wedging of the alignment pins in the alignment hole(s) in the upper tie plate or against the upper tie plate of the fuel assembly can go undetected since the fuel assemblies could nonetheless be in their parallel and proper positions within the reactor vessel (not shown). Potential resulting problems from the wedging of the alignment pin in alignment hole of the upper tie plate of the nuclear fuel assembly will usually not be detected until the next refueling or maintenance operation when the upper core support plate will again be removed. One of the potential resulting problems which can and does occur is the unintentional lifting of a fuel assembly.

At the next refueling operation, the upper core support plate would be lifted during preparations for defueling, and the irradiated fuel assembly which had become wedged and stuck to the upper core support plate because of the bent alignment pin(s) would also be lifted.

An unintentional lifting and unsecured removal of an irradiated nuclear fuel assembly from the reactor core in this manner would at least result in substantial delay and inconvenience in the refueling operations until the stuck fuel assembly is safely freed and secured. More importantly however, is the safety and health consequences of the potential release of fission products from within the fuel rods as a consequence of dropping the unintentionally lifted fuel assembly, perhaps onto other irradiated nuclear fuel assemblies, and breaching the fuel rod cladding. Since the primary coolant system is not a closed system during reactor refueling operations, the release of fission products would not thereby be entrained in the primary coolant system. Accordingly, the fission products would be released into the containment building.

The unintentional lifting of a fuel assembly when it is stuck or jammed with the alignment pin of the upper core support plate could go undetected if the weight of the stuck fuel assembly(ies) together with the weight of the upper core plate and upper core internals is within the maximum allowable weight for the upper core plate and upper core internals. The unintentional lifting of the fuel assembly could furthermore go undetected despite the adherence to other procedural or operational limitations. Similarly, the use of underwater lighting and cameras are susceptible to equipment failure and/or operator error and their installation and use do not ensure detection of the wedged pin or the lifting of the fuel assembly.

It would thus be an advantage if the unintentional lifting of a fuel assembly could be eliminated.

It would be a further advantage if the unintentional lifting and removal of a fuel assembly from the reactor core or vessel due to a wedged alignment pin of the upper core plate could be avoided.

It would thus be a further advantage if the unintentional lifting, removal and possible dropping a stuck fuel assembly could be eliminated.

SUMMARY OF THE INVENTION

A nuclear reactor fuel assembly for a pressurized water reactor comprising an upper tie plate, a lower tie plate, a control rod guide tube extending longitudinally between the upper tie plate and the lower tie plate, a plurality of substantially parallel fuel rods extending longitudinally, and a spacer grid extending transversely to the guide tube for supporting the plurality of fuel rods, wherein the upper tie plate has a first portion adapted to form an alignment bore to receive a corresponding alignment pin of the upper core support plate of said pressurized water reactor to align the fuel assembly with respect to the upper core support plate and wherein the first portion further includes means for disengaging from the upper tie plate so that the first portion is disengaged from the upper tie plate when a predetermined mechanical force is transmitted to the first portion, said force resulting from at least a portion of the weight of the fuel assembly being transmitted by the alignment pin being wedged within the alignment bore of the first portion.

DETAILED DESCRIPTION OF THE INVENTION

Figure 1:
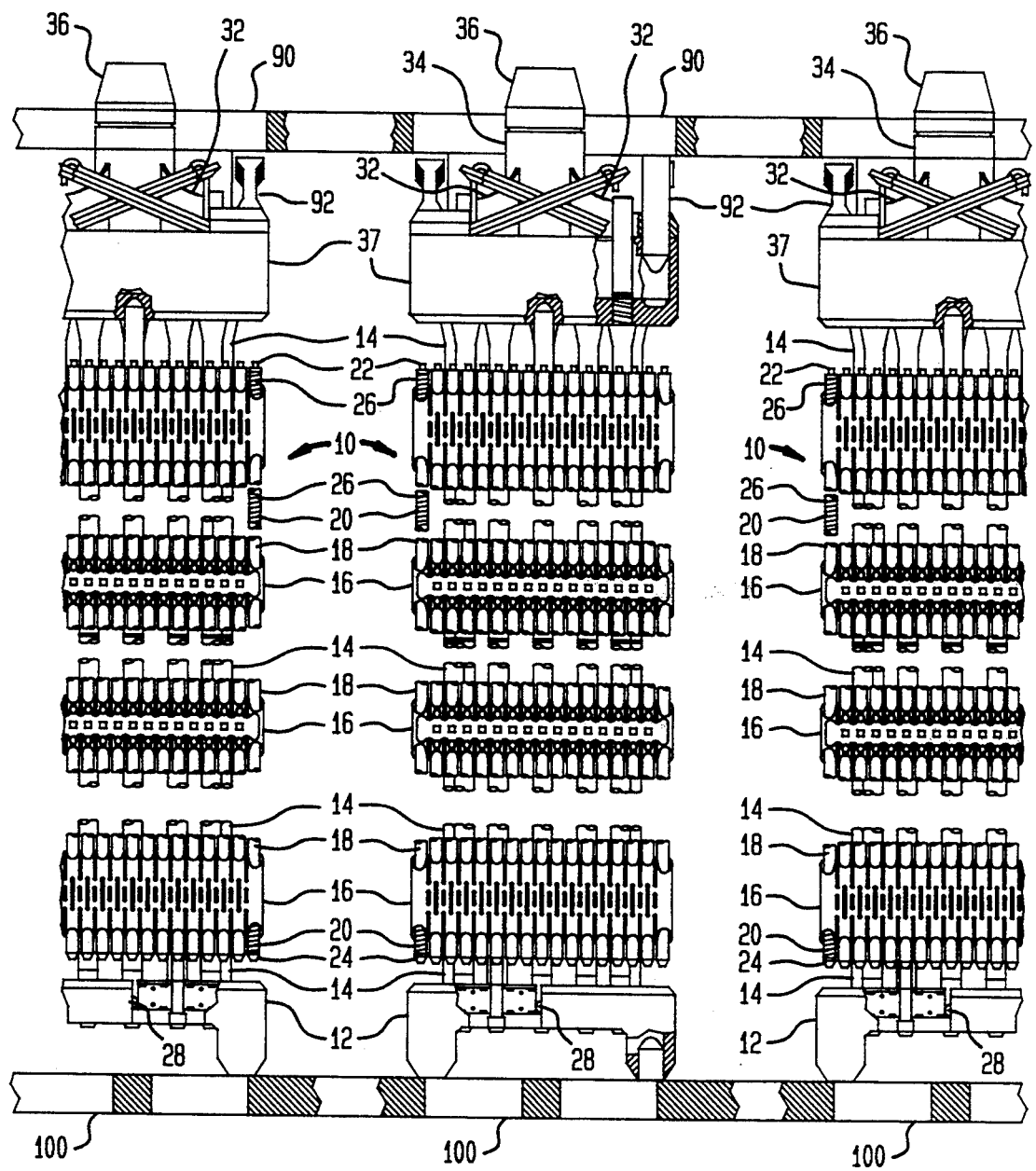
FIG. 1 represents a nuclear fuel assembly for a pressurized water reactor.

FIG. 1 represents a pressurized water reactor (PWR) nuclear fuel assembly 10 comprising a lower tie plate 12, guide tubes 14, spacer grids 16 spaced along the guide tubes, fuel rods 18 which are spaced radially and supported by spacer grid 16, instrumentation tube 28, and upper tie plate 37 attached to the upper ends of the guide tubes. Each fuel rod 18 generally includes nuclear fuel pellets 20 composed of fissionable material, and upper end plug 22 and lower end plug 24 which seal the fuel rod. Plenum spring 26 maintains the position of the pellets within the fuel rod. Water as the coolant/moderator is pumped upwardly through the fuel assemblies thereby removing the heat generated by the fuel rods. Control rods 30 which are used to assist in controlling the fission reaction are shown disposed in guide tubes 14. Several control rods are grouped together and each control rod has a radial arm 32 which interconnect with one another at a central cylindrical member 34 to form a control rod cluster control mechanism 36 for vertically lowering and raising the control rods in the cluster into and out of the guide tubes, and hence into and out of the fuel assembly.

As is well known in the art, the upper tie plate of pressurized water reactor nuclear fuel assemblies is designed to allow the alignment pins of the upper core support plate to be positioned into the alignment holes of the upper tie plate. These alignment pins may become bent, as discussed above, when the upper core support plate is removed and/or reinserted. If the alignment pins are bent so that they do not realign with the holes in the upper tie plate, they can inadvertently be forcefully jammed into or against the upper tie plate. The next time that the upper core support plate is removed, the stuck fuel assembly could be unintentionally removed with the upper core support plate if the pin is jammed into the fuel assembly alignment hole with sufficient force to hold the fuel assembly against its own weight. If the alignment pin is jammed into the fuel assembly but without the force to retain the fuel assembly and hold it in place, the fuel assembly could drop and the fission products trapped within the fuel rods could be released.

According to the present invention, the fuel assembly upper tie plate includes a disengaging upper tie plate corner post which is secured to the upper tie plate. The disengaging upper tie plate corner post is secured to the rest of the upper tie plate by securing pins, bolts, or other mechanical means for securing the post to the upper tie plate. The disengaging corner post will disengage from the upper tie plate when a predetermined force corresponding to less than the buoyance weight of the fuel assembly is applied to the disengaging post. It is preferred that the disengaging corner post would disengage from the upper tie plate when a load of 30% to 45% of the fuel assembly buoyancy weight is transmitted to the securing bolts, pins, or other mechanical securing means. The fuel assembly could then safely be lifted and moved using normal fuel assembly handling apparatus to a location where the upper tie plate would be repaired or replaced.

Figure 2:
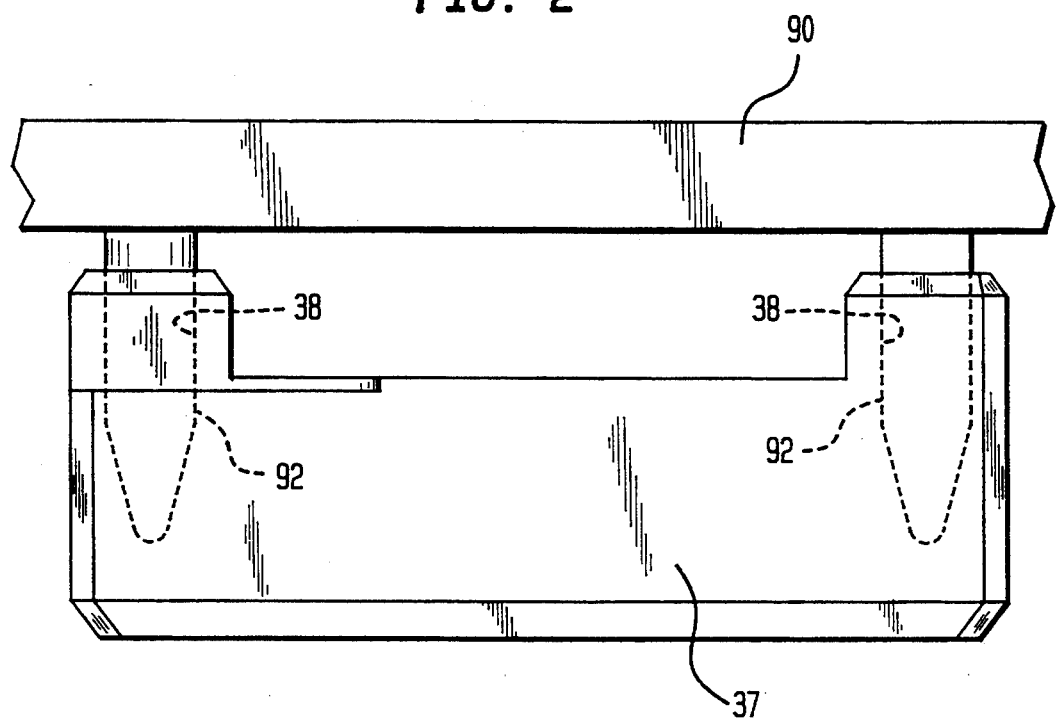
FIG. 2 is a schematic representation of an upper portion of a fuel assembly and the alignment pins of the upper core support plate properly positioned within the upper tie plate.
Figure 3:
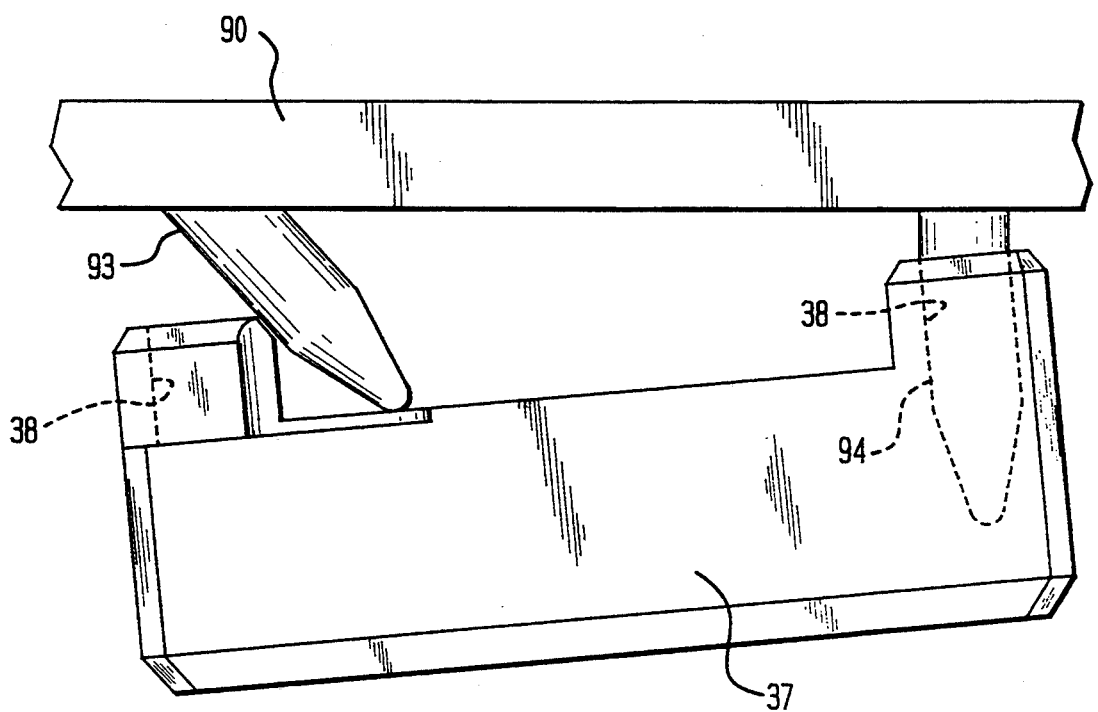
FIG. 3 is a schematic representation of the upper portion of the fuel assembly with one of two alignment pins of the upper core support plate bent and misaligned, and the other alignment pin bent, misaligned, and wedged into the upper portion of the fuel assembly.

FIG. 2 schematically represents a portion of a typical PWR nuclear fuel assembly and upper core support plate shown in FIG. 1. FIG. 2 shows upper tie plate 37 and upper core support plate 90 with the alignment pins 92 properly disposed through the alignment holes 38 in the upper tie plate. FIG. 3 schematically represents a bent alignment pin 93 which is not disposed through its corresponding alignment hole 38 in the upper tie plate, as well as a second alignment pin 94 which is bent and jammed in the alignment hole 38 of the upper tie plate of the fuel assembly.

Figure 4B:
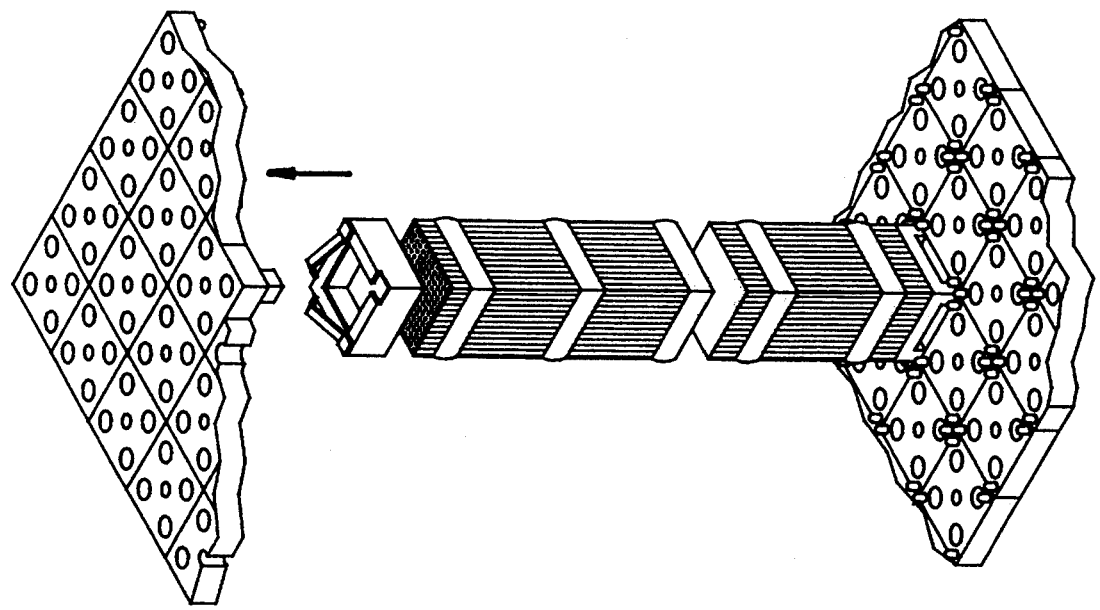
FIGS. 4A and 4B represent a fuel assembly having the disengaging corner post and positioned between the lower and upper core support plates, before and after lifting of the upper core plate.
Figure 4A:
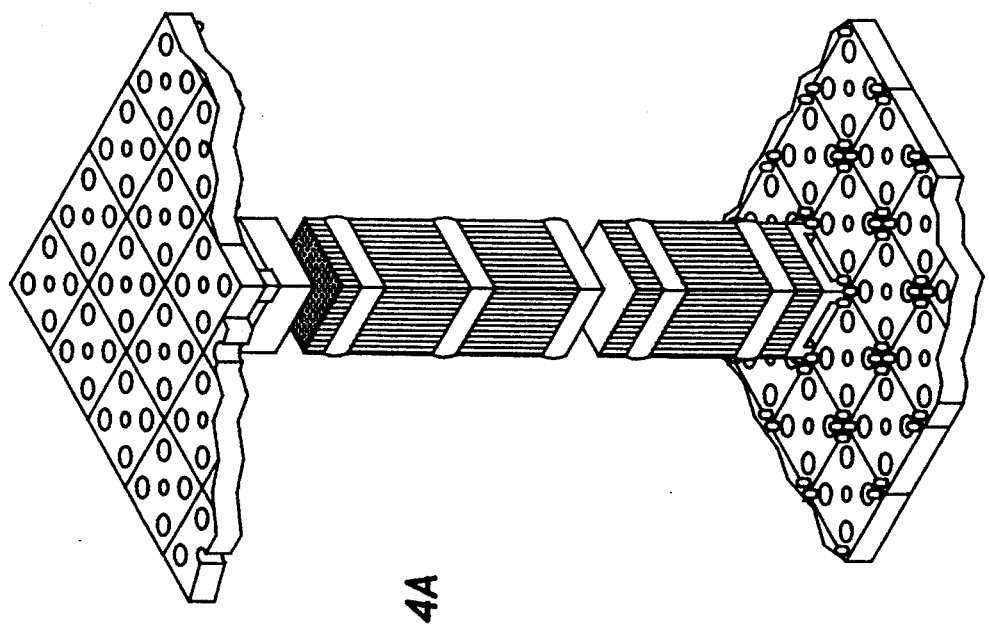

As the upper core support plate is removed and the weight of the fuel assembly is thereby imposed on the jammed pin (FIG. 4A), the disengaging upper tie plate corner post would disengage from the upper tie plate. The disengaging upper tie plate corner post would disengage from the rest of the fuel assembly thereby leaving the fuel assembly in its proper and intended position in the reactor core. After the disengaging upper tie plate corner post has disengaged from the upper tie plate, and thereby freed the wedged alignment pin from the upper tie plate, the disengaging upper tie plate corner post could remain jammed with the alignment pin and be removed together with the upper core support plate (FIG. 4B), or it could remain with the upper tie plate to be removed at a later time when the fuel assembly is removed. By remaining in its proper core position, the danger of unintentionally moving a fuel assembly stuck to a core support plate would be avoided.

Figure 5:
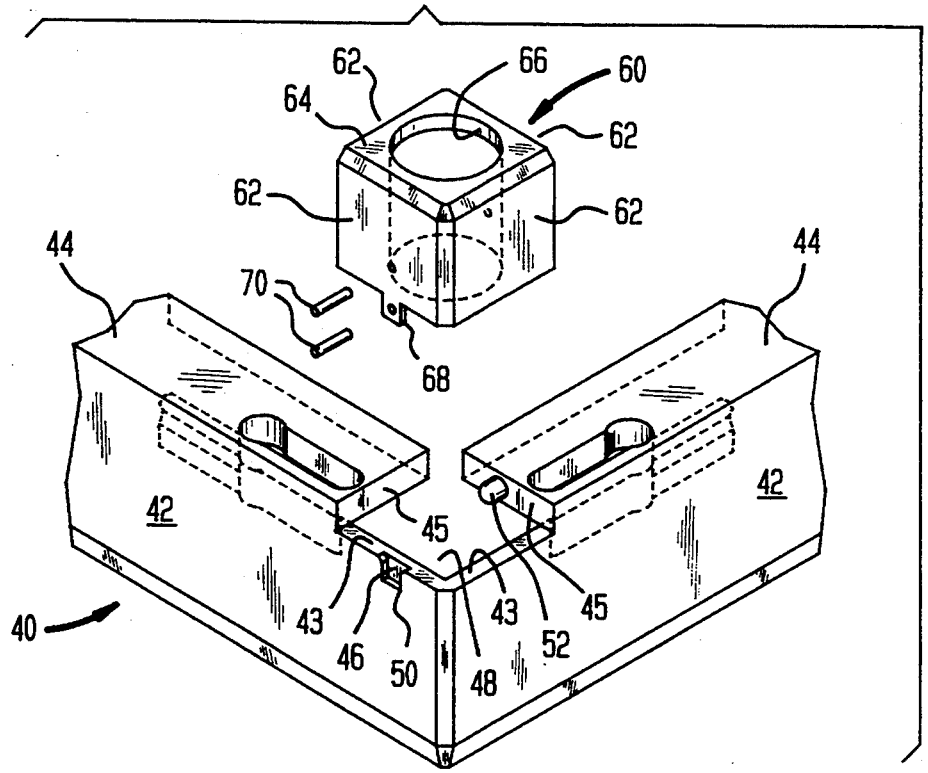
FIG. 5 is a detailed exploded view of the portion of the upper tie plate of the fuel assembly including the disengaging corner post.

FIG. 5 represents in an exploded view the preferred embodiment of the present invention in which, for purposes of clarity, only a portion of the upper tie plate and the disengaging upper tie plate corner piece of the nuclear fuel assembly is shown. Upper tie plate 40 includes upper tie plate side walls 42. Laterally extending from each wall 42 is horizontal grapple flange 44. At each of two diagonal corners of the upper tie plate 40 is a recess 48 formed by edges 43 and shoulders 45.

Disengaging upper tie plate corner post 60 which fits into recess 48 of upper tie plate 40 is secured to edge 43 and shoulder 45 by break-away pins 70. Disengaging corner post 60 is shown in this embodiment as having four side walls 62 and top 64 adapted to form guide pin alignment hole 66. The perimeter and shape of disengaging upper tie plate corner post 60 fits into and matches recess 48 formed by edges 43 and shoulders 45.

Disengaging upper tie plate corner post 60 includes a tab 68 extending from one of the walls 62. A matching slot 46 to tab 68 is formed in the face of one of upper tie plate sidewalls 42. Disengaging upper tie plate corner post 60 is secured to the upper tie plate 40 by break-away pin 70 which secures tab 68 within matching slot 46 by threading into bore 50, and by break-away pin 70 which secures sidewall 62 to shoulder 45 by threading into bore 52 as shown in FIG. 5.

The shape, material of construction, and strength of break-away pins 70 are selected so that each of the two pins 70 fracture when the shear stresses due to loading from the weight of the fuel assembly which is transmitted to the pin 70 due to the wedged alignment pin 94 of the upper core support plate 90 corresponds to less than the buoyance weight of the fuel assembly. In a preferred embodiment, the shear stress at fracture of the break-away pin(s) 70 is less than about 30% to about 45% of that corresponding to the full buoyancy weight of the fuel assembly.

Figure 6:
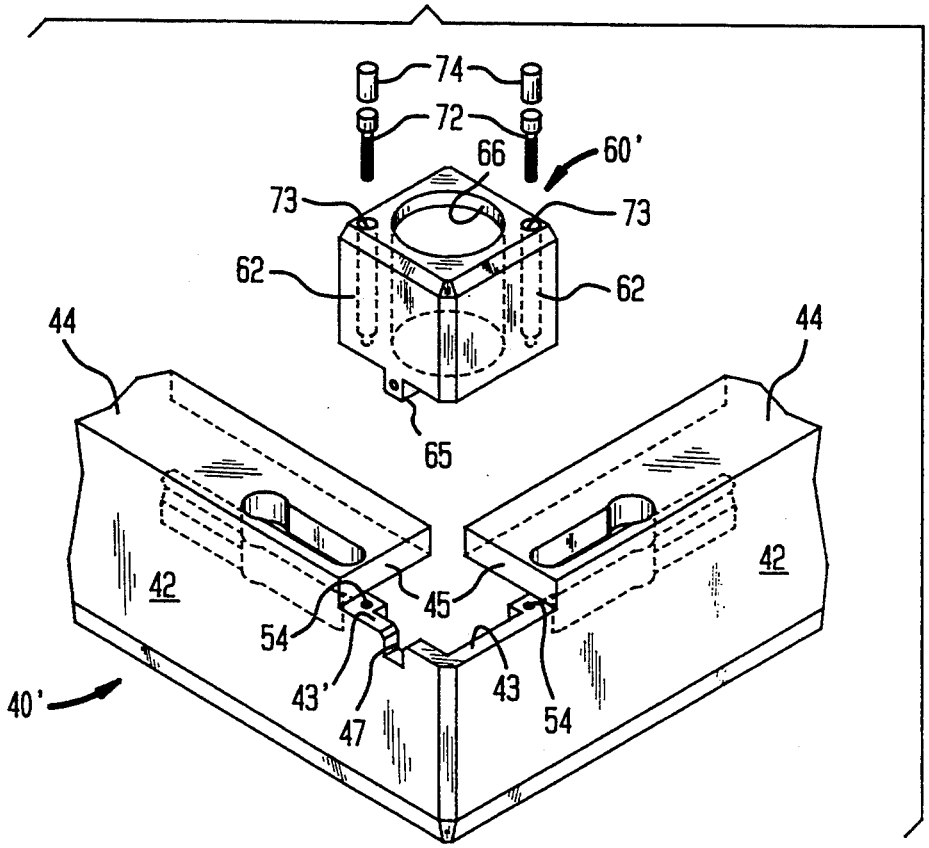
FIG. 6 is a detailed exploded view of an alternative embodiment of the present invention showing a portion of the upper tie plate of the fuel assembly including a disengaging corner post.

In an alternative embodiment of the present invention which is depicted in FIG. 6, disengaging corner post 60' has a rib 65 which fits into groove 47 of upper tie plate 40'. Break-away pins 72 extend through holes 73 into threaded apertures 54 in edges 43' of upper tie plate sidewalls 42. Caps 74 are installed over break-away pins 72.

Figure 7:
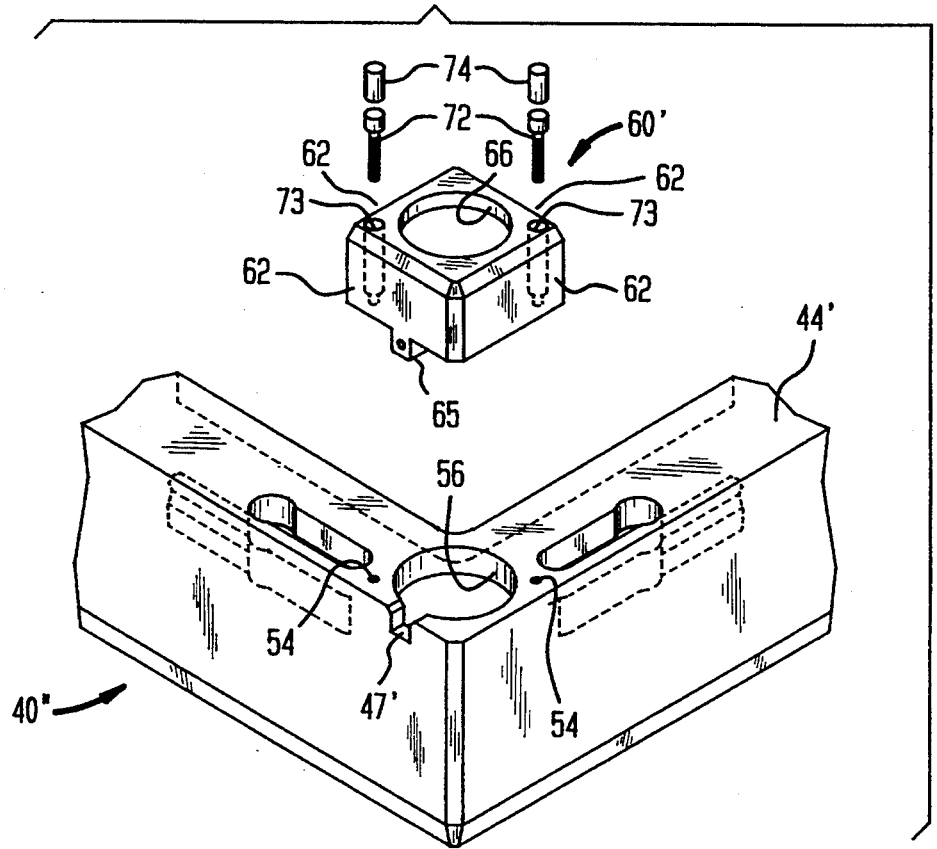
FIG. 7 is a detailed exploded view of another alternative embodiment of the present invention showing a portion of the upper tie plate including a disengaging corner post.

In a further alternative embodiment depicted in FIG. 7, disengaging upper tie plate corner post 60' has, as in the embodiment shown of FIG. 6, walls 62, alignment hole 66, and break-away pins 72 which extend through holes 73 to secure corner piece 60' to the horizontal grapple flanges 44' of the upper tie plate 40". Horizontal grapple flanges 44' are not adapted to form a recess as in the embodiments shown in FIGS. 5 and 6 into which an upper tie plate corner post fits. Instead, the corner post is secured to the top of flange 44 in which is formed an opening 56 to accommodate the length of the alignment pin. Because of its larger diameter, the alignment pin cannot become wedged in opening 56. Since there are two break-away pins in each of two disengaging upper tie plate corner posts for each fuel assembly, the shape, material of construction, and strength of break-away pins 72 shown in FIGS. 6 and 7 are selected so that they fracture when the tensile stresses due to the loading from the weight of the fuel assembly corresponds to less than the buoyance weight of the fuel assembly. In a preferred embodiment, the tensile stress at fracture of pins 72 is less than about 30% to about 45% of that corresponding to the full buoyancy weight of the assembly.

The particular shape and configuration of the disengaging upper tie plate corner post as well as the particular combination of break-away pins, bolts and means to secure the disengaging corner post to the upper tie plate is a matter of design choice which will be apparent to those having ordinary skill in the art. The examples shown and described above are exemplative of the invention and are not intended to limit the true scope of the invention.

While the present invention has been particularly shown and described with reference to preferred embodiments thereof, it will be understood by those skilled in the art that various changes in form and details may be made therein without departing from the spirit and scope of the invention.

We claim:

1. A nuclear reactor fuel assembly for a pressurized water reactor comprising:
   (a) an upper tie plate;
   (b) a lower tie plate;
   (c) a plurality of substantially parallel fuel rods extending longitudinally;
   (d) a spacer grid for supporting the plurality of fuel rods;
   wherein the upper tie plate has a first portion adapted to form an alignment bore to receive a corresponding alignment pin of the upper core support plate of said pressurized water reactor to align the fuel assembly with respect to the upper core support plate;
   wherein the first portion further includes means for disengaging from the upper tie plate so that the first portion is disengaged from the upper tie plate when a predetermined mechanical force is transmitted to the first portion, said force resulting from at least a portion of the weight of the fuel assembly being transmitted by the alignment pin being wedged against the alignment bore of the first portion.

2. A nuclear fuel assembly as in claim 1 wherein the upper tie plate is adapted to form a recess and wherein the first portion comprises a disengaging upper tie plate corner post adapted to be received in the recess formed in the upper tie plate.

3. A nuclear fuel assembly as in claim 2 wherein the means for disengaging comprises a break-away pin securing the corner post to the upper tie plate, the break-away pin fractures when the predetermined mechanical force results in shear stresses in the pin corresponding to less than the buoyance weight of the fuel assembly.

4. A nuclear fuel assembly as in claim 2 wherein the means for disengaging comprises a break-away pin securing the corner post to the upper tie plate, the break-away pin fractures when the predetermined mechanical force results in shear stresses in the pin corresponding to less than about 30% to about 45% of the buoyance weight of the fuel assembly.

5. A nuclear fuel assembly as in claim 3 wherein the disengaging upper tie plate corner post includes a plurality of walls which are adapted to conform to the recess in the upper tie plate, a first one of the plurality of walls further includes a tab;
   and wherein the upper tie plate further includes a plurality of vertical sidewalls and at least one flange extending horizontally from one of the plurality of vertical sidewalls, and at least one of the plurality of sidewalls adapted to form a slot;
   and wherein the break-away pin is at least two break-away pins, a first of the at least two break-away pins securing the tab of the corner post to the slot in the one of the plurality of sidewalls of the upper tie plate, and a second of the at least two break-away pins securing a second of the plurality of walls of the corner post to the flange of the upper tie plate.

6. A nuclear fuel assembly as in claim 2 wherein the means for disengaging comprises a break-away pin securing the corner post to the upper tie plate, the break-away pin fractures when the predetermined mechanical force results in tensile stresses in the pin corresponding to less than the buoyancy weight of the fuel assembly.

7. A nuclear fuel assembly as in claim 2 wherein the means for disengaging comprises a break-away pin securing the corner post to the upper tie plate, the breakaway pin fractures when the predetermined mechanical force results in tensile stresses in the pin corresponding to less than about 30% to about 45% of the buoyancy weight of the fuel assembly.

8. A nuclear fuel assembly as in claim 6 wherein the disengaging upper tie plate corner post includes a plurality of walls which are adapted to conform to the recess in the upper tie plate, a first one of the plurality of walls further includes a rib;

wherein the upper tie plate further includes a plurality of vertical sidewalls, and at least one of the plurality of sidewalls adapted to form a groove to receive the rib of the corner post;

and wherein the break-away pin is at least two break-away pins, a first one of the at least two breakaway pins secures the corner post to one of the plurality of sidewalls of the upper tie plate.

9. A nuclear fuel assembly as in claim 8 wherein the upper tie plate includes a flange extending horizontally from one of the sidewalls, and a second one of the at least two break-away pins securing a second of the plurality of walls of the corner post to the flange of the upper tie plate.

10. A fuel assembly as in claim 9 wherein the first one of the at least two break-away pins extends longitudinally and secures the corner post to a one of the plurality of sidewalls of the upper tie plate.

11. A nuclear fuel assembly as in claim 10 wherein a second of the at least two break-away pins extends longitudinally and secures the corner post to a second one of the plurality of sidewalls of the upper tie plate.

12. A nuclear reactor fuel assembly for a pressurized water reactor comprising:
(a) an upper tie plate;
(b) a lower tie plate;
(c) a control rod guide tube extending longitudinally between the upper tie plate and the lower tie plate;
(d) a plurality of substantially parallel fuel rods extending longitudinally;
(e) a spacer grid extending transversely to the at least one guide tube for supporting the plurality of fuel rods;
(f) a disengaging upper tie plate corner post adapted to form an alignment bore to receive a corresponding alignment pin of the upper core support plate of said pressurized water reactor to align the fuel assembly with respect to the upper core support plate;

wherein the corner post further includes a securing-disengaging means for securing the corner post to the upper tie plate and for disengaging from the upper tie plate so that the corner post is disengaged from the upper tie plate when a predetermined mechanical force is transmitted to the corner post, said force resulting from at least a portion of the weight of the fuel assembly being transmitted by the alignment pin being wedged within the alignment bore of the corner post.

13. The fuel assembly as in claim 12 wherein the upper tie plate includes a flange extending horizontally from a sidewall of the tie plate, and the securing-disengaging means comprises at least one break-away pin for securing the corner post to the flange and which fractures when the predetermined mechanical force results in tensile stresses corresponding to less than the buoyance weight of the fuel assembly.

14. The fuel assembly as in claim 12 wherein the upper tie plate includes a flange extending horizontally from a sidewall of the tie plate, and the securing-disengaging means comprises at least one break-away pin for securing the corner post to the flange and which fractures when the predetermined mechanical force results in tensile stresses corresponding to about 30% to about 45% of the buoyance weight of the fuel assembly.

15. The fuel assembly as in claim 14 wherein the at least one break-away pin is at least two pins extending longitudinally from the corner post into the flange of upper tie plate.

* * * * *